United States Patent [19]
Bakul et al.

[11] 3,890,430
[45] June 17, 1975

[54] METHOD OF PRODUCING DIAMOND MATERIALS

[76] Inventors: Valentin Nikolaevich Bakul, ulitsa Kirova, 34a, kv.12; Alexandr Alexandrovich Shulzhenko, ulitsa Novo-Konstantinovskaya, 17, kv.27; Anatoly Fedorovich Getman, ulitsa Syretskaya, 38, kv.2, all of Kiev, U.S.S.R.

[22] Filed: Jan. 28, 1974

[21] Appl. No.: 437,380

Related U.S. Application Data

[63] Continuation of Ser. No. 259,804, June 5, 1972, abandoned.

[30] Foreign Application Priority Data

Jan. 13, 1972 U.S.S.R............................. 1732201

[52] U.S. Cl................................. 423/446; 423/496
[51] Int. Cl........................................... C01b 31/06
[58] Field of Search..................................... 423/446

[56] References Cited
UNITED STATES PATENTS

| | | | |
|---|---|---|---|
| 2,947,609 | 8/1960 | Strong | 423/446 |
| 3,488,153 | 1/1970 | Bundy | 423/446 |

FOREIGN PATENTS OR APPLICATIONS

| | | | |
|---|---|---|---|
| 698,804 | 12/1964 | Canada | 423/446 |

*Primary Examiner*—Edward J. Meros
*Attorney, Agent, or Firm*—Holman & Stern

[57] ABSTRACT

To synthesize diamond a carbonaceous material in the presence of metals, such as zinc, magnesium, lead, cadmium, bismuth, tin, indium, antimony, thallium, aluminium, mercury and compounds thereof is subjected to a pressure of at least 60 kbar at a temperature of at least 1700°C within the range of diamond stability.

3 Claims, No Drawings

METHOD OF PRODUCING DIAMOND MATERIALS

This is a continuation of application Ser. No. 259,804, filed June 5, 1972, now abandoned.

The present invention relates to a method of producing superhard materials, and more specifically to a method of producing diamond by synthesis.

In a known method of diamond synthesis from a carbonaceous material in the presence of metals under elevated pressure and at a high temperature above 2000°C within the range of diamond stability, an additive comprising mercury and lead compounds is used in order to obtain diamond with lower content of impurities.

This method of synthesis of diamond requires, however, very high pressure and temperature.

In view of the above, the process of producing diamonds is practically uncontrollable. In addition, the diamonds obtained by this method are not well faceted. The process of synthesis takes place at high speed resulting in concretion of the crystals.

It is an object of the present invention to provide a method of synthesis of diamond at lower pressure and temperature (P, T) than heretofore could be used.

Another object of the invention is to provide a method of synthesis of stable and well faceted diamond crystals.

The above objects are accomplished by the method of synthesis of diamond according to the present invention, characterized in that, in addition to metals and compounds thereof used along with a carbonaceous material, metals used separately or in combination and selected from the group consisting of zinc, magnesium and compounds thereof, are also employed, the process being conducted under a pressure of at least 60 kbar and at a temperature of at least 1700°C.

Furthermore, in combination with the above-mentioned selected metals, metals and compounds used separately or in combination and selected from the group consisting of lead, lead selenide, cadmium, bismuth, tin, indium, antimony, thallium, aluminium and mercury oxide may be used.

The present invention will be better understood from the following description of the embodiments thereof.

In carrying out the method according to the present invention the carbonaceous material may comprise graphite and other carbonaceous materials capable of releasing free carbon convertible into diamond at high temperature and under elevated pressure. A reaction mixture may comprise a homogeneous mixture of spectrally pure graphite powders and alloys or mixtures of the above-mentioned metals, as well as compounds thereof. Furthermore, discs made of graphite, and discs made, e.g., of a magnesium-zinc alloy may be placed in a graphite heater layer by layer. Ratios between the carbonaceous material and the above-mentioned alloys or mixtures (or compounds thereof) are not critical in carrying out the method according to the invention.

The above-mentioned reaction-mixture is charged into a high pressure and high temperature apparatus of any appropriate design capable of ensuring pressure and temperature required to achieve synthesis of diamond. In a specific embodiment of the invention use may be made of an apparatus having an annular reaction space, members made of a hard alloy or steel being mounted adjacent to the bases of the apparatus, while the peripheral surface of the apparatus is made of a material exhibiting thermal- and electrical insulation properties, such as lithographic stone.

Heating of the reaction mixture under pressure may be effected by one of the known methods, particularly by means of a special graphite heater with electric current flowing therethrough.

Pressure in the high pressure apparatus is determined by a known method according to a change in electric resistance of metals, such as bismuth ($Bi_{II-III}$—27 kbar, $Bi_{III-IV}$—89kbar) thallium ($Tl_{II-III}$—37 kbar), barium ($Ba_{I-III}$—59 kbar) under pressure.

Accuracy of measuring the pressure in the high pressure apparatus is in the order of ±6 kbar. Temperature in the high pressure apparatus is determined according to melting points of various metals. Accuracy of measuring the temperature in the high pressure apparatus under a pressure of about 80 kbar is in the order of ±100°C.

The practical embodiment of the present invention will be now illustrated by the following Examples.

EXAMPLE 1

A homogeneous mixture of powders of spectrally pure graphite and an alloy consisting of 55 wt. percent of zinc and 45 wt. percent of magnesium used in a volumetric ratio of 9:1 was charged into a heater made of spectrally pure graphite, subjected to a pressure of about 63 kbar at a temperature of about 1750°C and was allowed to stay under these conditions for 5 minutes. 25 tests conducted under the above-mentioned conditions produced diamonds in all cases.

EXAMPLE 2

The process was performed under the same conditions as described in Example 1, but the solvent comprised a mixture of zinc and magnesium used in a weight ratio of 1:1. Diamonds were obtained in all 19 tests conducted.

EXAMPLE 3

A homogeneous mixture of powders of spectrally pure graphite and an alloy consisting of 80 wt. percent of lead and 20 wt. percent of magnesium used in a volumetric ratio of 5:1 was charged into a heater made of spectrally pure graphite, subjected to a pressure of up to 77 kbar at a temperature of up to about 1900°C and was allowed to stay under these conditions for 3 minutes. Diamonds were obtained in all 20 tests conducted.

EXAMPLE 4

The process was performed under the same conditions as described in Example 1, but the solvent comprised a mixture of cadmium and magnesium used in a weight ratio of 3:2. Diamonds were obtained in all 12 tests conducted.

EXAMPLE 5

Discs made of spectrally pure graphite and discs made of an alloy consisting of 20 wt. percent of bismuth, 20 wt. percent of magnesium, 10 wt. percent of cadmium, 10 wt. percent of tin, 20 wt. percent of lead and 20 wt. percent of indium were charged into a graphite heater layer by layer, subjected to a pressure of up to 80 kbar at a temperature of about 2000°C and was allowed to stay under these conditions for 2 minutes. Diamonds were obtained in all 10 tests conducted.

EXAMPLE 6

The process was performed under the same conditions as described in Example 5, but the solvent comprised a mixture of indium and magnesium in a weight ratio of 3:2. Diamonds were obtained in all 15 tests conducted.

EXAMPLE 7

The process was performed under the same conditions as described in Example 5, but the solvent comprised a tin-magnesium alloy in a weight ratio of 3:2. Diamonds were obtained in all of several tests conducted.

EXAMPLE 8

A homogeneous mixture of spectrally pure graphite and a mixture of metals consisting of 55 wt. percent of zinc and 45 wt. percent of magnesium used in a volumetric ratio of 6:1 was charged into a graphite heater, subjected to a pressure of from 60 to 90 kbar at a temperature of from 1700° to 2700°C and was allowed to stay under these conditions during 1–15 minutes. Diamonds were obtained in all 100 tests conducted under these conditions.

EXAMPLE 9

A homogeneous mixture of graphite and a mixture of metals consisting of 50 wt. percent of antimony and 50 wt. percent of magnesium was subjected to a pressure of up to about 75 kbar at a temperature of up to about 2000°C and was allowed to stay under these conditions for 5 minutes. Diamonds were obtained in all 5 tests conducted.

EXAMPLE 10

The process was performed under the same conditions as described in Example 9, but the metals used comprised a mixture of 50 wt. percent of thallium and 50 wt. percent of magnesium. Diamonds were obtained in all 3 tests conducted.

EXAMPLE 11

A homogeneous mixture of graphite and a mixture of metals consisting of 20 wt. percent of lead and 80 wt. percent of zinc used in a volumetric ratio of 5:1 was charged into a container made of lithographic stone, subjected to a pressure of up to 80 kbar at a temperature of up to 1950°C and was allowed to stay under these conditions for 5 minutes. Diamonds were obtained in all 10 tests conducted under these conditions.

EXAMPLE 12

A homogeneous mixture of graphite and a mixture of metals consisting of 50 wt. percent of cadmium and 50 weight percent of zinc used in a volumetric ratio of 4:1 was charged into a graphite heater, subjected to a pressure of up to 82 kbar at a temperature of up to 1850°C and was allowed to stay under these conditions for 4 minutes. Diamonds were obtained in all 12 tests conducted.

EXAMPLE 13

The process was performed under the same conditions as described in Example 12, but the metals used comprised aluminium and zinc. Diamonds were obtained in all tests conducted.

EXAMPLE 14

A homogeneous mixture of graphite and a mixture of compounds consisting of 70 wt. percent of lead selenide and 30 wt. percent of zinc oxide used in a volumetric ratio of 4:1 was charged into a graphite heater, subjected to a pressure of up to 78 kbar at a temperature of 1900°C and was allowed to stay under these conditions for 6 minutes. Diamonds were obtained in all 15 tests conducted under these conditions.

EXAMPLE 15

The process was performed under the same conditions as described in Example 14, but the metals used comprised a mixture consisting of 60 wt. percent of lead selenide, 10 wt. percent of zinc oxide, 20 wt. percent of cadmium, 10 wt. percent of mercury oxide. Diamonds were obtained in all tests conducted.

Diamonds obtained by the method according to the invention at lower pressure and temperature (P, T) were represented by single transparent and translucent well faceted crystals of cubical and cubical-octahedral habits. The spectral analysis revealed that a content of magnesium, zinc and other above-mentioned metals in the form of impurities in the diamonds obtained was as low as 0.001 percent.

The best results were obtained when either zinc or cadmium, or tin or lead were used in combination with magnesium. However, the use of other fusible metals, whether they form eutetics with magnesium or not, also results in lowering pressure and temperature of the synthesis. The use of zinc in combination with cadmium, lead, tin and other metals also results in lowering of pressure and temperature of the synthesis.

What we claim is:

1. In a method for the synthesis of diamond from a reaction mixture consisting of a carbonaceous material and a carbon solvent under a pressure of at least 60 kbar and at a temperature of at least 1,700°C within the range of diamond stability, the improvement consisting in that the carbon solvent consists of:
    a. a member selected from the group consisting of zinc, magnesium and combination thereof, and
    b. a member selected from the group consisting of lead, lead selenide, cadmium, bismuth, tin, indium, antimony, thallium, mercury oxide and conbinations thereof.

2. The method of claim 1, wherein said carbon solvent is an alloy of said members.

3. The method of claim 1, wherein said carbon solvent is a mixture of said members.

* * * * *